(12) United States Patent
Chen

(10) Patent No.: US 10,437,100 B2
(45) Date of Patent: Oct. 8, 2019

(54) LIGHT EMITTING UNIT AND BACKLIGHT HAVING THE SAME

(71) Applicant: SHENZHEN CHINA STAR OPTOELECTRONICS TECHNOLOGY CO., LTD., Shenzhen, Guangdong (CN)

(72) Inventor: Lixuan Chen, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 213 days.

(21) Appl. No.: 14/780,532

(22) PCT Filed: Aug. 20, 2015

(86) PCT No.: PCT/CN2015/087702
§ 371 (c)(1),
(2) Date: Sep. 26, 2015

(87) PCT Pub. No.: WO2016/201779
PCT Pub. Date: Dec. 22, 2016

(65) Prior Publication Data
US 2017/0139275 A1    May 18, 2017

(30) Foreign Application Priority Data
Jun. 19, 2015   (CN) .......................... 2015 1 0344395

(51) Int. Cl.
*G02F 1/1335*   (2006.01)
*F21S 2/00*     (2016.01)
(Continued)

(52) U.S. Cl.
CPC ........ *G02F 1/133603* (2013.01); *F21S 2/005* (2013.01); *G02F 1/133609* (2013.01);
(Continued)

(58) Field of Classification Search
None
See application file for complete search history.

(56) References Cited

U.S. PATENT DOCUMENTS

2007/0103646 A1* 5/2007 Young .................. G01J 1/32
353/52
2008/0303407 A1* 12/2008 Brunner ............. C09K 11/0883
313/496
(Continued)

FOREIGN PATENT DOCUMENTS

| CN | 101206345 A | * | 6/2008 |
| CN | 101876409 | | 11/2010 |
| CN | 101949514 | | 1/2011 |
| CN | 102072439 | | 5/2011 |
| CN | 103791318 | | 5/2014 |

OTHER PUBLICATIONS

International Search Report for PCT/CN2015/087702, English Translation attached to original, Both completed by the Chinese Patent Office dated Feb. 24, 2016, All together 6 Pages.

*Primary Examiner* — Britt D Hanley
(74) *Attorney, Agent, or Firm* — Mintz Levin Cohn Ferris Glovsky and Popeo, P.C.; Kongsik Kim; Jhongwoo Jay Peck

(57) ABSTRACT

A light emitting unit including a first substrate and a plurality of first light emitting elements arranged on the first substrate in a certain arrangement rule. The first light emitting elements are light emitting diodes (LEDs) or organic light emitting diodes (OLEDs) of the same kind, or the first light emitting elements are LEDs or OLEDs of different kind. An alternative a light emitting unit includes a second substrate and a plurality of second light emitting elements and a plurality of third light emitting elements arranged on the second substrate in a certain arrangement rule. The second light emitting elements are LEDs of the same kind or different kind, and the third light emitting elements are
(Continued)

OLEDs of the same kind or different kind. A backlight having the light emitting unit is also disclosed.

5 Claims, 2 Drawing Sheets

(51) Int. Cl.
*F21Y 105/16* (2016.01)
*F21Y 113/13* (2016.01)
*F21Y 115/10* (2016.01)
*F21Y 115/15* (2016.01)

(52) U.S. Cl.
CPC ....... *F21Y 2105/16* (2016.08); *F21Y 2113/13* (2016.08); *F21Y 2115/10* (2016.08); *F21Y 2115/15* (2016.08); *G02F 2001/133613* (2013.01)

(56) References Cited

U.S. PATENT DOCUMENTS

| | | | |
|---|---|---|---|
| 2009/0027588 A1* | 1/2009 | Medendorp, Jr. | G02F 1/133615 349/62 |
| 2009/0097271 A1* | 4/2009 | Chen | G02F 1/133603 362/612 |
| 2009/0284682 A1* | 11/2009 | Lee | G02B 6/0068 349/62 |
| 2010/0067219 A1* | 3/2010 | Tu | G02F 1/133603 362/97.1 |
| 2012/0113681 A1* | 5/2012 | Zheng | G02F 1/133603 362/612 |
| 2014/0132886 A1 | 5/2014 | Chen et al. | |

\* cited by examiner

LIGHT EMITTING UNIT AND BACKLIGHT HAVING THE SAME

CROSS-REFERENCE TO RELATED APPLICATION

This application is the U.S. national phase of PCT Appln. No PCT/CN2015/087702, filed Aug. 20, 2015 which claims priority to Chinese Application No. 201510344395.1, filed Jun. 19, 2015, the disclosures of which are incorporated in their entirety by reference herein.

TECHNICAL FIELD

The present disclosure belongs to a display technical field, specifically speaking, to a light emitting unit and a backlight having the same.

BACKGROUND ART

A liquid crystal display (LCD) generally includes a liquid crystal panel and a backlight module oppositely disposed, wherein the backlight module provides display light rays for the liquid crystal panel so that the liquid crystal panel completes the display. A conventional backlight module is matched with the liquid crystal panel in some aspects such as size, spectral color, brightness, and the like, thus ensuring that the color and brightness, etc. displayed by the liquid crystal panel have a favorable effect.

Color filters of different liquid crystal panels have different materials, different thicknesses and different transmissivity. Even if different liquid crystal panels have a same size, different designs for backlight modules is also required. In the existing backlight module, mostly a light emitting diode (LED) and an Organic Light Emitting Diode (OLED) are served as basic light emitting units, wherein the LED emits light rays with different wavelengths in accordance with different fluorescent powders and light emitting chips; and the OLED emits light rays with different wavelengths in accordance with different materials.

Display light rays generated by different backlight modules have different wavelengths. The liquid crystal panel presents different colors by means of a picture displayed by the display rays. For example, regarding an all-white picture, different backlight modules matched with a same color filter will present different chroma, wherein the chroma is based on a CIE1931 system.

With the development of the market and industry, current panel manufacturers mainly produce and sale the liquid crystal panels. In general, backlight modules are individually purchased and assembled in a complete machine factory (for example, TV manufacturers). To a panel manufacturer, various tests like a reliability test or a lighting test and the like performed to a liquid crystal panel mainly use a backlight module. Different size liquid crystal panels mainly differ in color filters, transmissivity, and the like. Adopting an unchangeable display light ray may lead to incorrect chroma of a white dot of different liquid crystal panels, which may bring harmful influence to the various tests.

SUMMARY

In order to solve the problem existing in the prior art, a purpose of the present disclosure lies in providing a light emitting unit, which includes a first substrate and a plurality of first light emitting elements. The plurality of first light emitting elements is arranged on the first substrate in a certain arrangement rule. The first light emitting elements are light emitting diodes (LEDs) or organic light emitting diodes (OLEDs) of the same kind, or the first light emitting elements are LEDs or OLEDs of different kind.

Furthermore, the plurality of first light emitting elements are arranged on the first substrate in an array arrangement way.

Another purpose of the present disclosure also lies in providing a light emitting unit, which includes a second substrate, a plurality of second light emitting elements and a plurality of third light emitting elements. The plurality of second light emitting elements and the plurality of third light emitting elements are arranged on the second substrate in a certain arrangement rule. The second light emitting elements are LEDs of the same kind or different kind, and the third light emitting elements are OLEDs of the same kind or different kind.

Furthermore, the plurality of second light emitting elements and the plurality of third light emitting elements are arranged on the second substrate in an array arrangement way.

Furthermore, the LEDs of the same kind are LEDs with a same light emitting spectrum and a same chroma.

Furthermore, the OLEDs of the same kind are OLEDs with a same light emitting spectrum and a same chroma.

Furthermore, the LEDs of different kind are LEDs with different light emitting spectrum and different chroma.

Furthermore, the OLEDs of different kind are OLEDs with different light emitting spectrum and different chroma.

Another purpose of the present disclosure further lies in providing a backlight, which includes the above plurality of light emitting units arranged in a certain arrangement rule.

Furthermore, the plurality of light emitting units are arranged in an array arrangement way.

Advantageous effects of the present disclosure is as follows: in the light emitting unit and the backlight of the present disclosure, a variety of kind of the light emitting elements may be arbitrarily deployed so that the display light rays generated by the backlight module have different spectrum, thus, the requirement of the panel manufacturer to a backlight module capable for generating display light rays with different spectrum is satisfied.

BRIEF DESCRIPTION OF THE DRAWINGS

These and/or other aspects, characteristics and advantages of the embodiments in the present disclosure will become apparent and more readily appreciated from the following description, taken in conjunction with the accompanying drawing in which.

DETAILED DESCRIPTION OF EXEMPLARY EMBODIMENTS

Figure 1:
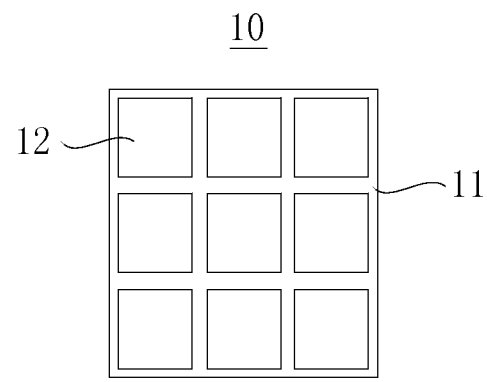
FIG. 1 is a schematic structure diagram of the light emitting unit according to the first embodiment of the present disclosure.

Embodiments of the present disclosure will be described in detail below by referring to the accompany drawings.

However, the present disclosure can be implemented in numerous different forms, and the present disclosure may not be explained to be limited hereto. Instead, these embodiments are provided for explaining the principle and actual application of the present disclosure, thus other skilled in the art can understand various embodiments and amendments which are suitable for specific intended applications of the present disclosure. In the drawings, in order to clarify the device, thicknesses of layers and regions are exaggerated. The same reference sign in the whole description and drawings may indicate the same element. It will be understood that although various elements may be described by using terms such as "first", "second", "third" and the like, the elements should not be limited by these terms. These terms are only used to distinguish one element from another.

FIG. 1 is a schematic structure diagram of a light emitting unit according to the first embodiment of the present disclosure.

Referring to FIG. 1, the light emitting unit 10 according to the first embodiment of the present disclosure includes: a first substrate 11 and a plurality of first light emitting elements 12. The plurality of first light emitting elements 12 are arranged on the first substrate 11 in an array arrangement way. The first light emitting elements 12 are light emitting diodes (LEDs) or organic light emitting diodes (OLEDs) of the same kind, or the first light emitting elements 12 are LEDs or OLEDs of different kinds.

In the present disclosure, an arrangement way of the plurality of first light emitting elements 12 is not limited as illustrated in FIG. 1, for example, the plurality of first light emitting elements 12 may also be arranged on the first substrate 11 in a circular shape or other proper shapes.

In the first embodiment of the present disclosure, the LEDs of the same kind are LEDs with a same light emitting spectrum and a same chroma (in a CIE1931 system).

The OLEDs of the same kind are OLEDs with a same light emitting spectrum and a same chroma (in a CIE1931 system).

The LEDs of different kind are LEDs with different light emitting spectrum and different chroma (in a CIE1931 system).

The OLEDs of different kinds are OLEDs with different light emitting spectrum and different chroma (in a CIE1931 system).

Figure 2:
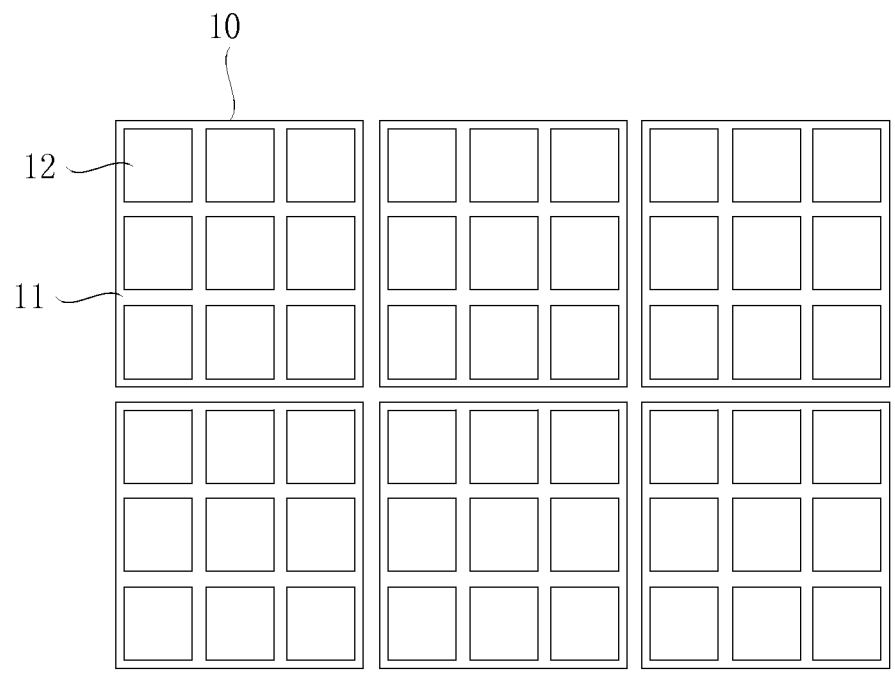
FIG. 2 is a schematic structure diagram of the backlight according to the first embodiment of the present disclosure.

FIG. 2 is a schematic structure diagram of a backlight according to the first embodiment of the present disclosure.

Referring to FIG. 2, the backlight according to the first embodiment of the present disclosure includes: a plurality of light emitting units 10, as illustrated in FIG. 1, arranged in an array arrangement way. However, in the present disclosure, an arrangement way of the plurality of light emitting units 10 is not limited as illustrated in FIG. 2, for example, the plurality of light emitting units 10 may also be arranged in a circular shape or other proper shapes.

Figure 3:
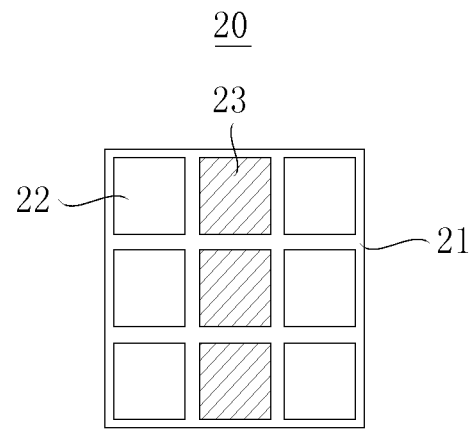
FIG. 3 is a schematic structure diagram of the light emitting unit according to the second embodiment of the present disclosure.

FIG. 3 is a schematic structure diagram of a light emitting unit according to the second embodiment of the present disclosure.

Referring to FIG. 3, the light emitting unit 20 according to the second embodiment of the present disclosure includes: a second substrate 21, a plurality of second light emitting elements 22 and a plurality of third light emitting elements 23. The plurality of second light emitting elements 22 and the plurality of third light emitting elements 23 are arranged on the second substrate 21 in an array arrangement way. The second light emitting elements 22 are LEDs of the same kind or different kind, and the third light emitting elements 23 are OLEDs of the same kind or different kind. In the present embodiment, the plurality of second light emitting elements 22 are arranged to be spaced apart from the plurality of third light emitting elements 23. However, the present disclosure is not restricted to such feature.

In the present disclosure, the arrangement way of the plurality of second light emitting elements 22 and the plurality of third light emitting elements 23 is not limited as illustrated in FIG. 3, for example, the plurality of second light emitting elements 22 and the plurality of third light emitting elements 23 may also be arranged on the second substrate 21 in a circular shape or other proper shapes.

In the second embodiment of the present disclosure, the LEDs of the same kind are LEDs with a same light emitting spectrum and a same chroma (in a CIE1931 system).

The OLEDs of the same kind are OLEDs with a same light emitting spectrum and a same chroma (in a CIE1931 system).

The LEDs of different kind are LEDs with different light emitting spectrum and different chroma (in a CIE1931 system).

The OLEDs of different kind are OLEDs with different light emitting spectrum and different chroma (in a CIE1931 system).

Figure 4:
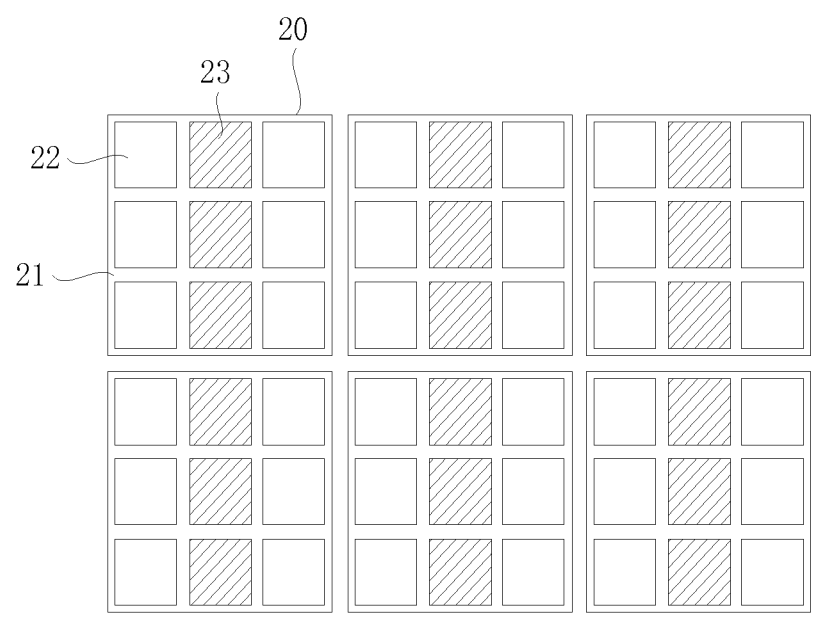
FIG. 4 is a schematic structure diagram of the backlight according to the second embodiment of the present disclosure.

FIG. 4 is a structure diagram of a backlight according to the second embodiment of the present disclosure.

Referring to FIG. 4, the backlight according to the second embodiment of the present disclosure includes: a plurality of light emitting units 20, as illustrated in FIG. 3, arranged in an array arrangement way. However, in the present disclosure, an arrangement way of the plurality of light emitting units 20 is not limited as illustrated in FIG. 4, for example, the plurality of light emitting units 20 may also be arranged in a circular shape or other proper shapes.

In addition, the backlight according to the first and second embodiments of the present disclosure may be applied in a backlight module as a light-emitting source of the backlight module. Since kinds of each light emitting element in the light emitting unit of the backlight may be arbitrarily allocated, backlight module adopting such a backlight can generate display light rays with different spectrum.

In conclusion, according to the light emitting unit and the backlight in the embodiments of the present disclosure, a variety of kinds of the light emitting elements may be arbitrarily deployed so that the display light rays generated by the backlight module have different spectrum, thus, the requirement of the panel manufacturer to a backlight module capable for generating display light rays with different spectrum is satisfied.

Although the present disclosure is described with reference to the special exemplary embodiments, while those skilled in the art will understand: various changes in form and details may be made therein without departing from the spirit and scope of the disclosure as defined by the appended claims and its equivalents.

The invention claimed is:

1. A light emitting unit, comprising:
   a second substrate;
   a plurality of second light emitting elements; and
   a plurality of third light emitting elements,
   wherein the plurality of second light emitting elements and the plurality of third light emitting elements include an entirety of light emitting elements disposed on the second substrate,
   wherein the plurality of second light emitting elements and the plurality of third light emitting elements are arranged on the second substrate in a certain arrangement rule, and wherein each of the plurality of second light emitting elements is an LED, and each of the plurality of third light emitting elements is an OLED, each of the plurality of second light emitting elements is selected to have light emitting spectrum and chroma different from each other, and each of the plurality of third light emitting elements is selected to have light emitting spectrum and chroma different from each other.

2. The light emitting unit according to claim 1, wherein the plurality of second light emitting elements and the plurality of third light emitting elements are arranged on the second substrate in an array arrangement way.

3. A backlight, comprising: a plurality of light emitting units arranged in a certain arrangement rule,
wherein the light emitting units comprise: a second substrate, a plurality of second light emitting elements and a plurality of third light emitting elements, wherein the plurality of second light emitting elements and the plurality of third light emitting elements are arranged on the second substrate in a certain arrangement rule,
wherein the plurality of second light emitting elements and the plurality of third light emitting elements include an entirety of light emitting elements disposed on the second substrate, and wherein each of the plurality of second light emitting elements is an LED, each of the plurality of third light emitting elements is an OLED, each of the plurality of second light emitting elements is selected to have emitting spectrum and chroma different from each other, and each of the plurality of third light emitting elements is selected to have emitting spectrum and chroma different from each other.

4. The backlight according to claim 3, wherein the plurality of light emitting units are arranged in an array arrangement way.

5. The backlight according to claim 3, wherein the plurality of second light emitting elements and the plurality of third light emitting elements are arranged on the second substrate in an array arrangement way.

* * * * *